United States Patent
Koseoglu (10) Patent No.: US 10,934,498 B1
(45) Date of Patent: Mar. 2, 2021

(54) COMBUSTION OF SPENT ADSORBENTS CONTAINING HPNA COMPOUNDS IN A MEMBRANE WALL PARTIAL OXIDATION GASIFICATION REACTOR

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/597,335

(22) Filed: Oct. 9, 2019

(51) Int. Cl.
 C10J 3/46 (2006.01)
 C01B 3/36 (2006.01)
 C01B 3/48 (2006.01)

(52) U.S. Cl.
 CPC .......... *C10J 3/466* (2013.01); *C01B 3/36* (2013.01); *C01B 3/48* (2013.01); *C01B 2203/0255* (2013.01); *C01B 2203/0283* (2013.01); *C01B 2203/0872* (2013.01); *C01B 2203/1247* (2013.01); *C01B 2203/1252* (2013.01); *C10J 2300/0906* (2013.01); *C10J 2300/0909* (2013.01); *C10J 2300/0946* (2013.01);
 (Continued)

(58) Field of Classification Search
 CPC .......... C10J 3/466; C10J 2300/0946; C10J 2300/1656; C10J 2300/1846; C10J 2300/0909; C10J 2300/0906; C01B 3/36; C01B 3/48; C01B 2203/0255; C01B 2203/0283; C01B 2203/1252; C01B 2203/0872; C01B 2203/1247
 See application file for complete search history.

(56) References Cited

U.S. PATENT DOCUMENTS

| 4,447,315 A | 5/1984 | Lamb et al. |
| 4,954,242 A | 9/1990 | Gruia |
| 5,190,633 A | 3/1993 | Fetzer et al. |

(Continued)

OTHER PUBLICATIONS

"Application of Sorption and Advanced Oxidation Processes for Removal of Phenols from Aqueous Solutions", Lidia Dabek, vol. 17, Issue 1, 2015, pp. 616-645 (Abstract only).
(Continued)

*Primary Examiner* — Anthony J Zimmer
*Assistant Examiner* — Syed T Iqbal
(74) *Attorney, Agent, or Firm* — Abelman, Frayne & Schwab (57) ABSTRACT

A process for the economical and environmentally acceptable disposal of spent adsorbent recovered from an adsorption column used to remove HPNA compounds and HPNA precursors from hydrocracking unit bottoms and/or recycle streams includes removing the liquid hydrocarbon oil from the spent adsorbent material by a combination of solvent flushing, and/or heating and vacuum treatment, grinding the dried adsorbent material containing the HPNA compounds and HPNA precursors to produce free-flowing particles of a predetermined maximum size, and introducing the particulate adsorbent material into a membrane wall partial oxidation gasification reactor to produce hydrogen and carbon monoxide synthesis gas, or syngas, which can be further processed by the water-gas shift reaction to increase the overall hydrogen recovered from the initial feed to the gasifier.

22 Claims, 2 Drawing Sheets

(52) U.S. Cl.
CPC .................. *C10J 2300/1656* (2013.01); *C10J 2300/1846* (2013.01)

(56) References Cited

U.S. PATENT DOCUMENTS

| | | |
|---|---|---|
| 7,588,678 B2 | 9/2009 | Barthelet et al. |
| 7,678,262 B2 | 3/2010 | Barthelet et al. |
| 7,763,163 B2 | 7/2010 | Koseoglu |
| 8,062,509 B2 | 11/2011 | Serban et al. |
| 8,721,927 B2 | 5/2014 | Koseoglu |
| 8,828,219 B2 | 9/2014 | Koseoglu |
| 9,056,771 B2 | 6/2015 | Koseoglu et al. |
| 9,534,179 B2 | 1/2017 | Koseoglu |
| 10,011,786 B1 | 7/2018 | Eizenga et al. |
| 10,035,960 B2 | 7/2018 | Koseoglu et al. |
| 2013/0067815 A1* | 3/2013 | Koseoglu ............... C10G 47/06 48/211 |
| 2017/0130141 A1* | 5/2017 | Koseoglu ............. C10G 25/003 |

OTHER PUBLICATIONS

"Usefulness of a Technique Based on Negative Corona Discharge for the Degradation of Selected, Condensed PAHs: Application to the Oxidation of Anthracene and Similar Structures", D. Tessier et al., 2000, pp. 157-164.

\* cited by examiner

COMBUSTION OF SPENT ADSORBENTS CONTAINING HPNA COMPOUNDS IN A MEMBRANE WALL PARTIAL OXIDATION GASIFICATION REACTOR

BACKGROUND OF THE INVENTION

Field of the Invention

This invention relates to a process for the environmentally acceptable disposal of spent adsorbent material containing heavy poly nuclear aromatic (HPNA) compounds and HPNA precursor molecules removed from hydrocracking unit bottoms.

Description of Related Art

HPNA Removal from Hydrocracking Unit Bottoms

Hydrocracking processes are widely used commercially in petroleum refineries to process a variety of feeds boiling in the range of 370° C. to 520° C. in conventional hydrocracking units and boiling at 520° C. and above in vacuum residue hydrocracking units. In hydrocracking processes, molecules of the feed are split into smaller ones that are lighter and that have a higher average volatility and economic value. Additionally, hydrocracking processes typically improve the quality of the hydrocarbon feedstock by increasing the hydrogen-to-carbon ratio and by removing organosulfur and organonitrogen compounds. The significant economic benefit derived from hydrocracking processes has resulted in the development of substantial process improvements and more active catalysts.

In addition to sulfur-containing and nitrogen-containing compounds, a typical hydrocracking unit feedstream, such as vacuum gas oil (VGO), contains polynuclear aromatic (PNA) compounds, e.g., those formed of less than seven fused benzene rings. As the feedstream is subjected to hydroprocessing at elevated temperatures and pressures, heavy polynuclear aromatic (HPNA) compounds having seven or more fused benzene rings are formed and are present in high concentration in the unconverted hydrocracking unit bottoms. For this reason, PNA compounds are commonly referred to as "HPNA precursors", which term will be used below and in the claims.

Heavy feedstreams such as de-metalized oil (DMO) or de-asphalted oil (DAO) have much higher concentrations of nitrogen, sulfur and PNA compounds than VGO feedstreams. These impurities can lower the overall efficiency of the hydrocracking unit by requiring higher operating temperatures, higher hydrogen partial pressure and/or additional reactor/catalyst volume. High concentrations of impurities can also accelerate catalyst deactivation.

Three major hydrocracking processes schemes employed in refineries are single-stage once-through hydrocracking, series-flow hydrocracking with or without recycle, and two-stage recycle hydrocracking. Single-stage once-through hydrocracking is the simplest of the hydrocracking unit configurations and is typically employed when the required operating conditions are more severe than those of hydrotreating processes, and less severe than conventional high pressure hydrocracking processes. It employs one or more reactors for both hydrotreating and the hydrocracking reaction, and the catalyst must be capable of performing both the hydrotreating and the hydrocracking steps. This configuration is cost effective, but typically results in relatively low product yields, e.g., a maximum conversion rate of about 60% of the feed. Single-stage hydrocracking is often designed to maximize mid-distillate yields over a single or dual catalyst system. Dual catalyst systems can be used in a stacked-bed configuration or in two separate reactors. The effluents are passed to a fractionation column to separate the $H_2S$, $NH_3$, light gases ($C_1$-$C_4$), naphtha and diesel products boiling in the temperature range of 36-370° C. The hydrocarbons boiling above 370° C. are unconverted bottoms that, in the single stage system, are passed to other refinery operations.

Series-flow hydrocracking with or without recycle is one of the most commonly used configurations. It uses one reactor containing both hydrotreating and hydrocracking catalysts, or two or more reactors for both the hydrotreating and the hydrocracking reaction steps. Unconverted bottoms from the fractionation column are recycled to the first reactor for further cracking. This configuration converts heavy crude oil fractions, e.g., vacuum gas oil, into lighter products and has the potential to maximize the yield of naphtha, jet fuel, or diesel, depending on the recycle cut point used in the distillation section.

Two-stage recycle hydrocracking uses two or more reactors and the feedstock is hydrotreated, e.g., hydrodesulfurized and hydrodenitrogenized, and then hydrocracked in the first stage. The first-stage effluents are sent to a fractionation column to recover the light gases comprising $C_1$-$C_4$, $H_2S$, $NH_3$, and naphtha and diesel, and the unconverted bottoms from the fractionation column are passed to the second stage reactor for further cracking. Since the first reactor accomplishes both hydrotreating and hydrocracking, the feed to the second reactor is virtually free of ammonia and hydrogen sulfide. This permits the effective use of high performance zeolite catalysts which would otherwise be susceptible to poisoning by sulfur, and/or nitrogen compounds present in the initial feed.

A typical hydrocracking feedstock is vacuum gas oil boiling in the nominal range of 370° C. to 520° C., and DMO or DAO boiling above 520° C. either or both of which can be blended with the vacuum gas oil. For instance, a typical hydrocracking unit processes vacuum gas oils that for optimum operation contain from 10V % to 25V % of DMO or DAO. Under some circumstances, 100% DMO or DAO can be processed; however, the DMO or DAO streams contain significantly more nitrogen, i.e., 2000 ppmw vs. 1000 ppmw, and a higher micro carbon residue (MCR) content of 10 W % vs. <1 W % for the VGO stream.

The DMO or DAO in the blended feedstock to the hydrocracking unit can have the effect of lowering the overall efficiency of the unit, i.e., by requiring higher operating temperatures or greater catalyst/reactor volumes for existing units or higher hydrogen partial pressures or additional reactor/catalyst volumes for the existing grass-roots units. These impurities can also reduce the quality of the desired intermediate hydrocarbon products in the hydrocracked effluent. When DMO or DAO are processed in a hydrocracking unit, further processing of the hydrocracking reactor effluents may be required to meet the refinery fuel specifications, depending upon the refinery configuration. When the hydrocracking unit is operating in its desired mode, that is to say, producing products of good quality, its effluent can be utilized in blending and to produce gasoline, kerosene and diesel fuel to meet established fuel specifications.

In addition, the formation of HPNA compounds and their precursors is an undesirable side reaction that occurs in recycle hydrocracking units. The HPNA molecules form by the dehydrogenation of larger aromatic molecules or by the cyclization of side chains onto existing HPNA compounds followed by dehydrogenation, which mechanism is favored as the reaction temperature increases. Once formed, if HPNA compounds are allowed to accumulate in the system, further polymerization will occur resulting in the formation of gums that attach to equipment and are difficult to remove. HPNA formation depends on many known factors including the type of feedstock, catalyst selection, process configuration, and operating conditions. Since HPNA compounds accumulate in the recycle system and then cause equipment fouling, the concentration of HPNA compounds and their precursors in the recycle bottoms must be controlled.

Methods known to the art to separate or treat HPNA compounds include adsorption, hydrogenation, extraction, solvent deasphalting, and bleeding a predetermined portion of the recycle stream that is cracked or utilized elsewhere in the refinery. Hydrocracking unit bottoms can be treated in separate units to eliminate the HPNA compounds and the HPNA-free bottoms returned to the hydrocracking reactor.

In a typical refinery, the HPNA adsorption zone includes at least two packed bed columns which are gravity fed or pressure force-fed sequentially in order to permit continuous operation when one of the beds is being regenerated, i.e., the beds are operated in swing mode. The columns contain an effective quantity of adsorbent material, such as attapulgus clay, alumina, silica gel, silica-alumina, fresh or spent catalysts, or activated carbon. The packing can be in the form of pellets, spheres, extrudates or natural shapes, having a size of about 4 mesh to about 60 mesh, and in certain embodiments about 4 mesh to about 20 mesh based on the United States Standard Sieve Series. Where activated carbon is used, it can be in the form of powdered activated carbon (PAC) or granular activated carbon (GAC). The packed columns are generally operated at a pressure in the range of from about 1 $kg/cm^2$ to about 30 $kg/cm^2$, in certain embodiments about 1 $kg/cm^2$ to about 20 $kg/cm^2$, and in further embodiments about 1 $kg/cm^2$ to about 10 $kg/cm^2$. The effluent stream from the working adsorbent column is monitored for the concentration of HPNA compounds to determine whether the effluent is meeting the product specifications. At such time as the HPNA/precursors concentration exceeds a predetermined value, the feed to that column is shut down and transferred to a column containing fresh adsorbent material. The saturated spent HPNA adsorbent is removed from the column and the column is refilled with fresh adsorbent material.

Lamb et al. U.S. Pat. No. 4,447,315, the disclosure of which is incorporated herein in its entirety by reference, describes a single-stage recycle hydrocracking process in which unconverted bottoms are contacted with an adsorbent to remove PNA compounds. Unconverted bottoms having a reduced concentration of PNA compounds are recycled to the hydrocracking reactor.

Gruia U.S. Pat. No. 4,954,242, the disclosure of which is incorporated herein in its entirety by reference, describes a single-stage recycle hydrocracking process in which an HPNA-containing heavy fraction from a vapor-liquid separator downstream of a hydrocracking reactor is contacted with an adsorbent in an adsorption zone. The heavy fraction with a reduced HPNA concentration is then either recycled to the hydrotreating zone or introduced directly into the fractionation zone.

Adsorption of a DMO or DAO feedstream to a hydrocracking unit to remove nitrogen-containing compounds, sulfur-containing compounds and PNA compounds is described in commonly owned U.S. Pat. No. 7,763,163, the entire disclosure of which is incorporated herein by reference. This process is described as effective for removal of impurities, and a separate VGO feedstock is illustrated as the feed to the hydrocracking reactor along with the treated DMO or DAO feed. However, a relatively high concentration of HPNA compounds remains in the unconverted hydrocracking unit bottoms.

The use of an adsorbent material to reduce the HPNA compounds in a hydrocracking recycle stream and HPNA precursors in the hydrocracking feedstock is described in U.S. Pat. Nos. 8,828,219 and 9,534,179, commonly owned, the entire disclosures of which are incorporated herein by reference. The adsorbent is regenerated and reused in the process until it reaches the end of its useful life cycle.

Gasification Reactors

Gasification is well known in the art and it is practiced worldwide and is applied to process solids and heavy liquid fossil fuels, including refinery bottoms. The gasification process uses partial oxidation to convert carbonaceous materials, such as coal, petroleum, biofuel, or biomass with oxygen at high temperature, i.e., greater than 800°, into synthesis gas ("syngas"), steam and electricity. The syngas consisting of carbon monoxide and hydrogen can be burned directly in internal combustion engines, or used in the manufacture of various chemicals, such as methanol via known synthesis processes and to make synthetic fuels via the Fischer-Tropsch process.

In refinery operations, the main process block is known as the Integrated Gasification Combined Cycle (IGCC), which converts the feedstock into hydrogen, power and steam. The process flow diagram of a conventional IGCC of the prior art, which includes a feed preparation section, a gasification reactor, an air separation unit, a syngas quench and cooling unit, a water-gas shift reactor, an acid gas removal (AGR) and sulfur recovery unit (SRU), a gas turbine, a heat recovery steam generator (HRSG), and a steam turbine.

In a conventional IGCC, a feedstock is introduced to a feed preparation section. The prepared feedstock is then passed to a gasification reactor with a predetermined amount of oxygen produced from an air separation unit. The feedstock is partially oxidized in a gasification reactor to produce a hot syngas which is conveyed to syngas quench and cooling units. Hot syngas is cooled with boiler feed water to produce cooled syngas and steam. A portion of the steam is passed to, and used in a water-gas shift reactor to produce shifted gas, and the remaining portion of the steam is consumed in the HRSG. Shifted gas is treated in an AGR/SRU unit to separate and discharge carbon dioxide, sulfur. A second portion of the hydrogen syngas is passed to a gas turbine with air feed and combusted to produce electricity. The high pressure combustion gas discharge from the gas turbine is conveyed to a HRSG to generate steam which is used in a steam turbine to produce additional electricity.

The three principal types of gasification reactor technologies are the moving bed, fluidized bed and entrained-flow systems. Each of the three types can be used with solid fuels, but only the entrained-flow reactor has been demonstrated to efficiently process liquid fuels. In an entrained-flow reactor, the fuel, oxygen and steam are injected at the top of the gasifier through a co-annular burner. The gasification usually takes place in a refractory-lined vessel which operates at a pressure of about 40 bars to 60 bars and a temperature in the range of from 1300° to 1700°.

There are two types of gasifier wall construction: refractory wall and membrane wall. The gasifier conventionally uses refractory liners to protect the reactor vessel from corrosive slag, thermal cycling, and the elevated temperatures that range from 1400° to 1700° C. The refractory is subjected to the penetration of corrosive components from the generation of the syngas and slag and, thereafter, to subsequent reactions in which the reactants undergo significant volume changes that result in degradation of the strength of the refractory materials. The replacement of the degraded refractory linings can cost several millions of dollars a year and several weeks of downtime for a given reactor. One solution to the downtime problem is the installation of a second or parallel gasifier to provide the necessary continuous operating capability during maintenance downtime. The undesirable consequence of this duplication is a significant increase in the capital costs associated with the unit operation.

As to the refractory wall gasifier, an alternative membrane wall gasifier technology uses a cooling screen protected by a layer of refractory material to provide a surface on which the molten slag solidifies and flows downwardly to the quench zone at the bottom of the reactor. The advantages of the membrane wall reactor include reduced reactor dimensions as compared to other systems; a significantly greater average on-stream time of 90%, as compared to an on-stream time of 50% for a refractory wall reactor; elimination of the need to have a parallel reactor to maintain continuous operation as in the case of refractory wall reactors; and the build-up of a layer of solid and liquid slag that provides self-protection to the water-cooled wall sections.

The build-up of a layer of solidified mineral ash slag on the wall of the membrane wall gasifier serves as an additional protective surface and insulator to minimize or reduce refractory degradation and heat losses through the walls. The water-cooled reactor design also avoids what is termed "hot wall" gasifier operation, which requires the construction of thick multiple-layers of expensive refractories which are subject to degradation. In the membrane wall reactor, the slag layer is renewed continuously with the deposit of molten slag on the relatively cool surface; the molten slag flows down over the stationary layer of solidified slag and in one configuration passes through a water quench and is eventually collected and removed from the reactor. Further advantages include shorter start-up/shut down times; lower maintenance costs than the refractory type reactor; and the capability of gasifying feedstocks with high ash content, thereby providing greater flexibility in treating a wider range of coals, petcoke, coal/petcoke blends, biomass co-feed and liquid feedstocks.

There are two principal types of membrane wall partial oxidation reactor designs that are adapted to process solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use. In both of these reactors, the flow of pressurized cooling water in the tubes is controlled to cool the refractory and ensure the downward flow of the molten slag. Both systems have demonstrated high utility with solid fuels, but not with liquid fuels.

The gasification reactor is operated to produce synthesis gas, or syngas. For the production of liquid fuels and petrochemicals, the key parameter is the mole ratio of hydrogen-to-carbon monoxide in the dry syngas. This ratio is usually between 0.85:1 and 1.2:1, depending upon the characteristics of the feedstock. Additional treatment of the syngas is needed to increase this ratio of hydrocarbon-to-carbon to 2:1 for Fischer-Tropsch applications, or to produce additional hydrogen through the water-gas shift reaction represented by $CO+H_2O \rightarrow CO_2+H_2$ In some cases, part of the syngas is burned together with some of the off gases in a combined cycle to produce electricity and steam. The overall efficiency of this process is between 44% and 48%.

The problem addressed by the present disclosure is providing an improved method for the internal disposal of spent adsorbent materials containing HPNA compounds and HPNA precursors that accumulate in refineries that is both cost effective and beneficial to the efficient operation of the refinery, and that is environmentally acceptable.

SUMMARY OF THE INVENTION

The above needs are met and other advantages are provided by the process of the present disclosure for the disposal in an environmentally responsible manner of the spent adsorbent recovered from an HPNA removal process or system used to treat the bottoms from a hydrocracking unit or a hydrocracking recycle stream to remove HPNA compounds and HPNA precursors by introducing the spent adsorbent material into a water cooled membrane wall partial oxidation reactor to produce principally hydrogen and carbon monoxide, i.e., synthesis gas.

In accordance with the process of this disclosure, the combustion of a spent adsorbent material containing HPNA compounds and HPNA precursors in a membrane wall partial oxidation gasification reactor to produce the synthesis gas includes the following steps:

a. recovering the spent adsorbent from the adsorption column;

b. drying the spent adsorbent containing HPNA compounds and HPNA precursors at a temperature in the range of from 20° C. to 80° C. to reduce the amount of retained hydrocarbon oil to a predetermined weight percent;

c. grinding the dried spent adsorbent containing HPNA compounds and HPNA precursors to produce a free-flowing mass of ground adsorbent particles;

d. introducing the free-flowing mass of ground adsorbent particles into a fluid feedstream to form a moving mixed feedstream;

e. introducing the moving mixed fluid feedstream containing the ground adsorbent particles into the membrane wall partial oxidation gasification reactor;

f. introducing steam and a predetermined volume of an oxygen-containing gas into the reactor for combustion to produce a mixture of hot gases containing carbon monoxide and hydrogen, and molten mineral slag;

g. recovering the mixture of hot gases from the reactor in which the mineral slag is condensed on the wall to solidify and/or descend in a molten form to a quench zone prior to recovery.

In preparation for reducing the spent adsorbent to a flowable particulate state, the adsorption column is drained to remove as much of the liquid hydrocarbons present as possible. In an embodiment, the adsorbents in the column are flushed with a light solvent solution to wash as much of the hydrocarbons present as possible from the spent adsorbent in the column or fixed bed reactor. The solvent can be a light distillate such as naphtha boiling in the range of 36° C. to 180° C. or gas oil boiling in the range of 180° C. to 370° C., or a combination of these solvents.

The flushing solvent and hydrocarbons removed can be sent to any suitable unit for fractionation to separate the distillate solvent from the oil stripped from the column. If the distillate is high in sulfur, for example, having been obtained from the atmospheric distillation column, the hydrocarbon and flushing solvent stream is preferably returned to the atmospheric distillation column. In the case where the distillate solvent is low in sulfur, the flushing solvent and hydrocarbon removed from the spent adsorbent can be transferred to a hydrocracking unit fractionator.

Following the solvent flushing step, the adsorbent is preferably dried with pressurized heated nitrogen to vaporize and drive off any longer chain hydrocarbons which were not soluble in the flushing solvent. The nitrogen stripping gas is introduced into the bottom of the column, or other stripping zone to which the spent adsorbent containing HPNA/precursors has been transferred, via a distribution plate at a sufficient rate to promptly achieve the removal of the hydrocarbon oil. In an alternative embodiment, following stripping of the adsorbent material in the column with the heated nitrogen gas, a vacuum is applied to further desorb remaining hydrocarbon oil residues. The vacuum should be held at less than 600 mHg for at least approximately 30 minutes in order to achieve a low explosive level of hydrocarbon vapors associated with the mass of spent adsorbent material. The rate of vacuum loss should be less than 25-50 mmHg/hour. The effect of the low vacuum is to minimize the risk of an explosion during the subsequent processing of the spent adsorbent material, as will be explained below.

Alternatively, further drying of the spent adsorbent can be accomplished by introducing non-compacted material from the adsorption column into a heated industrial drying apparatus that continuously agitates the mass of material to facilitate its uniform drying and to reduce the size of larger agglomerates that would be difficult to introduce in the grinding apparatus. A suitable drying apparatus will rotate on a generally horizontal axis and can be of the batch type or continuous for the uninterrupted processing of the spent adsorbent and the transfer of the dried material to the grinding step.

The adsorbent material that has been removed from the adsorption column or from the stripping zone and dried as described above is then transferred to the grinder or pulverizer mill for crushing to achieve the predetermined particle size specification. A pulverizer mill such as that used to pulverize coal for combustion in the steam generating furnace of a power plant is suitable for this purpose. As will be understood by one of ordinary skill in the art, the relative dryness of the stripped adsorbent material is not critical to the subsequent processing. However, some further release of trapped hydrocarbons may occur during the pulverizing and/or grinding of the material due to the frictional forces and heat generated during the actual breaking up of the adsorbent material into smaller particles. For this reason, the pulverizing zone or apparatus should be under positive vacuum ventilation with the fumes removed to avoid the accumulation of a potentially explosive mixture of hydrocarbon gases in the vicinity of the equipment. The pulverized solid material can be continuously screened and any oversized pieces returned for further crushing until they pass through the sorting screen.

The pulverizing mill or other suitable grinding apparatus is operated to produce particles falling within a predetermined size range, e.g., from 35 mesh to 70 mesh Tyler that are free-flowing and that can be conveyed from the grinding station, e.g., via a mechanical conveyor belt, a pressurized air stream in a closed conduit, or other known means. Following grinding, the free-flowing mass can optionally be conveyed to a storage vessel proximate the gasifier where it is accumulated for metering at a predetermined rate of feed to the gasification reactor.

The ground material is sampled and tested for carbon content before being mixed with the gasifier feed. The determination of the carbon content is important since this value is relied upon in determining the amount of oxygen that is introduced into the gasifier to achieve the desired degree of partial oxidation of spent adsorbent and the components of the liquid hydrocarbon feedstream. As will be understood by one of skill in the art, if the spent adsorbent material is activated carbon, substantially all of the feed will be combusted. If the spent adsorbent material is one or more of attapulgus clay, a fresh or spent catalyst, the non-combustible material will form an ash that is deposited as a protective slag on the side wall/walls of the reactor.

As noted above, where the spent adsorbent is activated carbon saturated with HPNA/precursors, the addition of a solid ash-producing material to hydrocarbon oil fuel to the membrane wall partial oxidation gasification reactor is required to form sufficient slag material to condense on the cooled reactor wall/side walls to form a protective solid slag coating and flow of molten liquid slag. The solid ash-producing material can include natural and/or synthetic oxides. Suitable materials for forming the slag on the reactor walls are one or more oxides of elements from Groups IA-VA, IVB, VIIIB of the Periodic Table. Preferred compounds include one or more oxides of Si, Al, Fe, Ca, Mg, P, K, Na, S and Ti. The oxides are of the type typically produced by the partial combustion of coal. The amount of sulfur present in heavy oils such as vacuum residues, bitumens, and in solids such as asphaltenes and coke is high and the oxides formed are solid sulfates or sulfites. The solid ash-producing material content can constitute from 2% to 10 w % of the hydrocarbon oil fuel, with lower values in the range being preferred. In some embodiments, the solid ash-producing material content can constitute from 2% to 5 w % of the hydrocarbon oil fuel.

The solid ash-producing material is preferably in the form of finely divided particles that are free-flowing in a dry state. The particle size is sufficiently small to avoid any clogging of nozzles or other distribution means in the reactor. The particles should pass Tyler mesh size 35 screen. These particles are preferably introduced into the liquid feed sufficiently upstream of the membrane wall reactor to provide for their distribution throughout the flowing fuel stream. In order to assure a uniform mixing of the particles, the feed stream can be passed through an in-line mixer, or other devices that are known in the art to achieve the desired degree of mixing of a dry material in a liquid stream to which it is added.

Where the spent adsorbent is attapulgus clay, alumina, silica-alumina, silica gel, spent or fresh catalysts, the flowable particulate material will produce some amount of molten mineral slag when it is combusted in the reactor. These materials are tested to determine the amount of ash-forming material is present in the spent adsorbent material in order to determine how much, if any, additional ash-forming material must be added with the other feed components to the reactor to assure that the required protective layer of molten slag will be formed. These test protocols are within the skill of the art.

The flowable particles can advantageously be introduced into the partial oxidation reactor (1) with the pressurized oxygen or oxygen-containing gas supplied for combustion, or (2) mixed with all or a portion of a liquid hydrocarbon fuel in a separate vessel and fed under pressure into the reactor.

In an embodiment, the ratio of oxygen-to-carbon in the gasifier can range from 0.5:1 to 10:1 by weight, and from 1:1 to 2:1 by weight with a lower range being preferred. In an embodiment, the stream is introduced into the reactor combustion chamber in a ratio of from 0.1:1 to 10:1 by weight of carbon in the feedstock; and in an embodiment from 0.1:1 to 2:1 by weight; and in a preferred embodiment, in a ratio from 0.4:1 to 0.6:1 by weight.

For convenience, in the description that follows, the designation "HPNA compounds/precursors" will be understood from the context to include HPNA compounds alone or in combination with HPNA precursors.

BRIEF DESCRIPTION OF THE DRAWING

The invention will be described in greater detail below and with reference to the attached drawings in which the same and similar elements are referred to by the same number, and where.

DETAILED DESCRIPTION OF THE INVENTION

Figure 1:
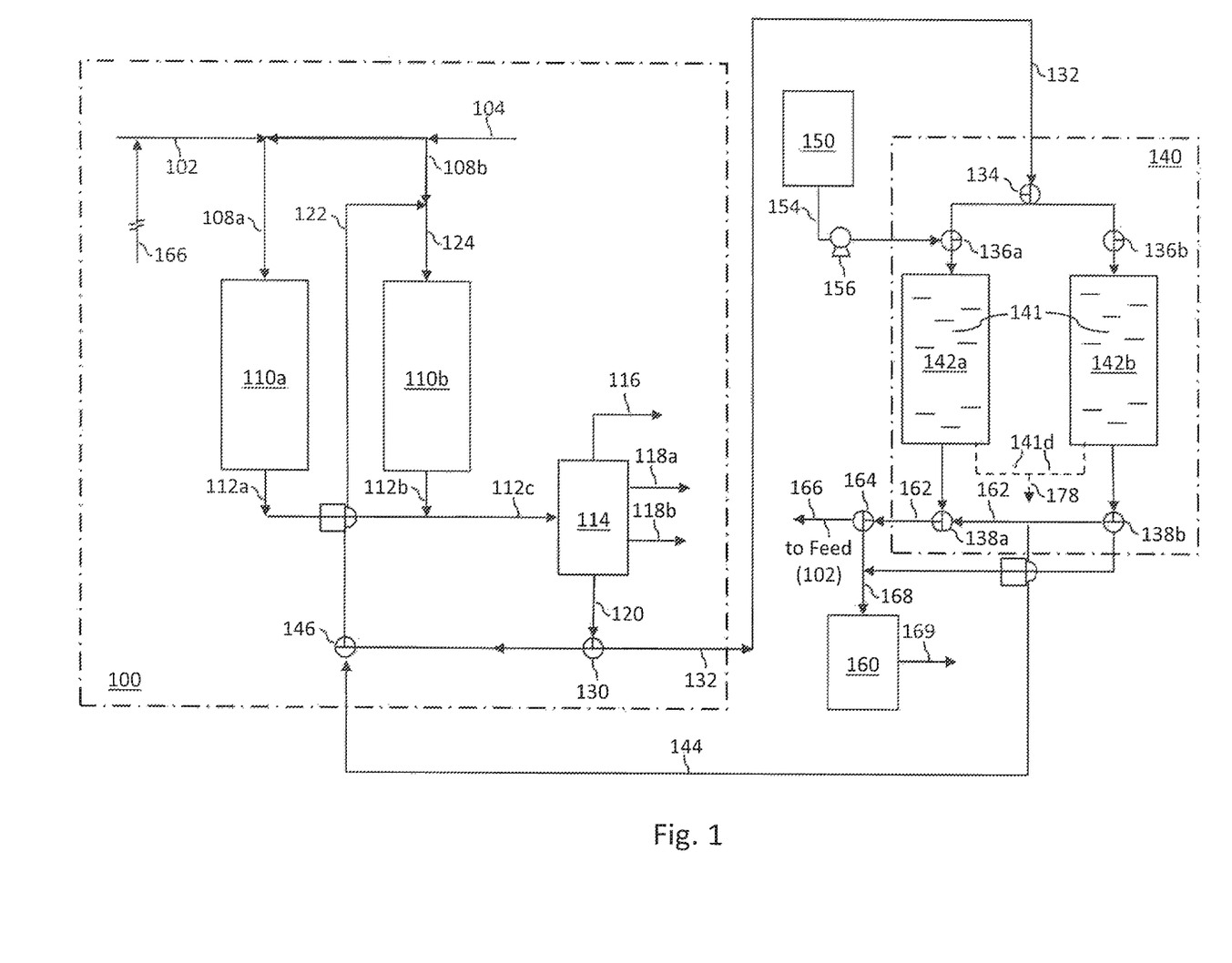
FIG. 1 is a simplified schematic process flow diagram of a two-stage hydrocracker with recycle and associated HPNA/precursor adsorption unit of the prior art in combination with a portion of the system of the present disclosure for preparing the spent adsorbent material for further treatment.

The process of the invention will be further described with reference to the schematic flow diagram of the FIG. 1 that illustrates a two-stage hydrocracking unit (100) with recycle that is representative of the prior art, and which includes two catalytic reactors (110a, 110b). The fresh feed (102) is introduced with the hydrogen feed (104) via mixed reactant feed line (108) into the first stage reactor (110a) to produce catalytically cracked product and by-products, which are discharged with uncracked feed via discharge line (112a) and passed to the fractionator (114). The fractionator bottoms (120) are identified as a process recycle stream and are introduced with hydrogen (104) as mixed feed (122) into the second stage reactor (110b) for further cracking and discharged as second stage hydrocracking reaction products (112b) that is combined with the reaction products (112a) of the first stage reactor as the combined reaction products stream (112c) that is introduced into the fractionator (114).

The fractionator (114) illustratively produces off-gases (116) comprising light hydrocarbons and any unreacted hydrogen remaining in the combined stream (112c), multiple side streams (118a, 118b) that are recovered as products, or for further downstream processing, and the bottoms which are passed as recycle stream (120) to the second stage reactor (110b).

As described above, the hydrocracking reactions produce as undesirable by-products HPNA compounds and their precursors ("HPNA/precursors"), which accumulate in the recycle stream (120). As will be understood by one familiar with the art, a similar problem exists with HPNA/precursors build-up in a single-stage hydrocracking unit where the bottoms from the fractionator are recycled to the inlet of the single reactor and there mixed with fresh feed and hydrogen, generally as described above in connection with the two-stage reactor unit operation.

In accordance with the practice of the prior art, the fractionator bottoms recycle stream (120) is passed via three-way valve (130) and adsorber feed line (132) to adsorbent treating zone (140) that comprises at least two adsorbent-packed columns (142a, 142b) containing beds of adsorbent material (141) that alternatively operate in swing mode to adsorb HPNA/precursors from the hydrocracking recycle stream (120). The treated fractionator bottoms with reduced HPNA/precursor content is discharged from adsorbent treating zone (140) via treated recycle line (144) for return to the second stage reactor (110b).

When the bed that is in use, e.g., adsorbent bed (142a), is no longer providing a treated product stream (150) that meets the predetermined specification for reduced HPNA/precursor content, the recycle stream is directed to the other column (142b) via 3-way valve (134). The adsorbent column that is substantially saturated with HPNA/precursors is either (1) flushed with a solvent for the purpose of removing some of the HPNA/precursors in order to extend the useful life of the column, or (2) the column is prepared for removal of the spent adsorbent material (141) and its eventual replacement with fresh adsorbent material.

In accordance with the process of the present disclosure, when it is determined that the adsorbent material is spent, i.e., that it has reached the end of its economically useful life, the spent adsorbent material in the column is treated as follows:

a. the flow of the hydrocarbon oil stream to the spent adsorbent in column (140a) is discontinued and it is directed to column (140b) containing fresh absorbent by adjusting 3-way valve (134);

b. the remaining hydrocarbon oil is drained from the spent adsorbent material in column (140a) via 3-way valve (138), return oil discharge line (162) and 3-way valve (164) to be combined with fresh feed (102);

c. introducing a light distillate flushing solvent (150) into the adsorption column (142a) to remove soluble hydrocarbon oil compounds from the adsorbent material and discharging the flushing solvent/oil mixture via 3-way valve (164), discharge line (162) and 3-way valve (164) into solvent/oil recovery vessel (160) for eventual further processing and solvent recovery; and d. further treating the spent adsorbent material (141) in the adsorption column (142a) or alternatively, in a separate drying zone to significantly reduce the amount of retained hydrocarbon oil in the spent adsorbent material to a predetermined value.

Figure 2:
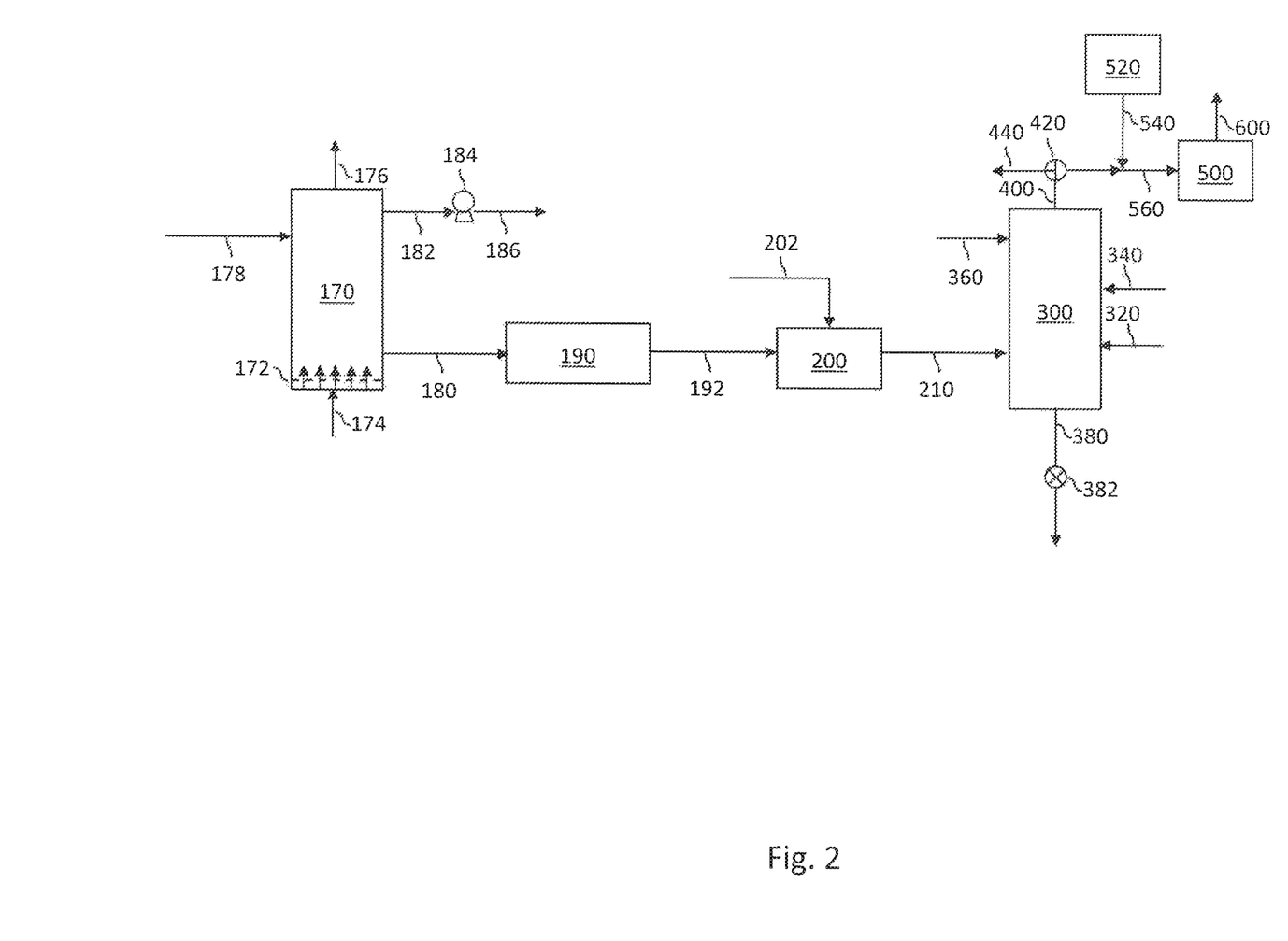
FIG. 2 is the portion of the system of the present disclosure for drying and grinding the spent adsorbent for introduction into the membrane wall partial oxidation reactor.

In a preferred embodiment that is described below, the spent adsorbent containing HPNA compounds and HPNA precursors is transferred from adsorbent column (142a) via discharge conduit (141d) and transfer line (178) and introduced into a drying zone (170) shown in FIG. 2 to further strip hydrocarbon oil from the spent adsorbent prior to being passed to grinding zone (190) where it is processed by conventional apparatus known in the art to a provide free-flowing mass of dry particulate spent adsorbent material containing HPNA/precursors and discharged via a transfer line (192), e.g., a conveyor and passed to mixing zone (200).

A liquid residual oil hydrocarbon feed (202) is admitted from a refinery unit operation via a volume regulating control valve (not shown) and introduced into the mixing zone (200). The uniform mixture of ground spent adsorbent particles containing HPNA/precursors and the liquid hydrocarbon fuel (202) is discharged from the mixing zone via feed line (210) and is introduced into the gasification zone (300) and combusted in the partial oxidation gasification reactor with predetermined amounts of steam (320) and oxygen (340) that are based upon the carbon content of the mixture constituting the feed (210). Additional fuel (360), and ash-forming material are optionally added as explained above.

The partial oxidation reaction is well known in the art, and proceeds in gasification zone (300) where the solid ash component produced during combustion contacts the water-cooled sides of the membrane wall reactor and a portion is sufficiently cooled to form a solid insulative coating of slag, and the balance is cooled to form a liquid slag that flows down the surface where it eventually enters a quench zone at the base of the gasification zone and is withdrawn as required via slag outlet line (380) and a flow control valve (382). The raw syngas (400) produced in the gasification zone (300) can be withdrawn via three-way control valve (420) for distribution via line (440) for use in other downstream processes.

In a preferred embodiment of the present invention, some or all of the syngas (400) passes via three-way control valve (420) to a water-gas shift ("WGS") reaction zone (500). Upstream of the WGS reaction zone, steam (520) introduced via conduit (540) is mixed with the syngas and the mixture (560) is introduced into WGS reaction zone (500). The carbon monoxide component of the syngas reacts with the water molecules in the steam to produce additional hydrogen and carbon dioxide in the WGS reactor. The shifted syngas product, now having a significantly higher concentration of hydrogen is recovered as product (600).

EXAMPLES

The following examples are based on computer modeling using an established proprietary system.

Example 1—Comparative Example

A 100 kg sample of dry fresh activated carbon adsorbent free of HPNA compounds and HPNA precursors is gasified in a gasification reactor at 1045° C. The ratio of water-to-carbon is 0.6:1 by weight. The ratio of oxygen-to-carbon is 1:1 by weight. The raw syngas and steam are sent to a water-gas shift reaction zone to increase the hydrogen yield in the product stream. The water-gas shift reaction zone is operated at 318° C. and 1 bar. The mole ratio of steam-to-carbon monoxide is 3:1; 12.5 kg of hydrogen is obtained after the shift reaction.

Example 2

A 100 kg sample of a spent adsorbent that is dried and reduced to a flowable particulate form as described above that contained 30 kg of HPNA compounds and HPNA precursors is gasified in a gasification reactor at 1045° C. The ratio of water-to-carbon is 0.6:1 by weight. The ratio of oxygen-to-carbon is 1:1 by weight. The raw syngas recovered and mixed with steam and the mixture is passed to a water-gas shift reaction zone to increase the hydrogen yield in the product stream. The water-gas shift reaction zone is operated at 318° C. and 1 bar. The mole ratio of steam-to-carbon monoxide is 3:1; 18.5 kg of hydrogen is obtained after the gasification.

Example 3

A 100 kg sample of a spent adsorbent is dried and reduced to particulate form as described above. The sample contains 50 kg of HPNA compounds and HPNA precursors and is gasified in a gasification reactor at 1045° C. The ratio of water-to-carbon is 0.6:1 by weight. The ratio of oxygen-to-carbon is 1:1 by weight. The raw syngas and steam are sent to a water-gas shift reaction zone to increase the hydrogen yield in the product stream. The water-gas shift reaction zone is operated at 318° C. and 1 bar. The mole ratio of steam-to-carbon monoxide is 3:1; 22.5 kg of hydrogen was obtained after the gasification.

In accordance with the process of the invention, valuable end products, e.g., syngas and/or hydrogen are obtained from a spent adsorbent containing HPNA compounds/precursors and relatively low value residual oils via partial oxidation in a membrane wall gasification reactor.

Although the process of the present disclosure has been described in detail above and illustrated in the attached figure, modifications and variations will be apparent to those skilled in the art from this description, and the scope of protection for the invention is to be determined by the claims that follow.

The invention claimed is:

1. An integrated process for the gasification of a spent adsorbent material containing HPNA compounds and HPNA precursors to produce a hydrogen and carbon monoxide synthesis gas, the spent adsorbent material being recovered from an adsorption column used to treat a hydrocarbon oil stream comprising hydrocracker unit bottoms and hydrocracker recycle streams, the process comprising:
    a. discontinuing the flow of the hydrocarbon oil stream to the adsorption column;
    b. draining the remaining hydrocarbon oil from the adsorption column;
    c. introducing a distillate flushing solvent boiling in the range of 36° C. to 370° C. into the adsorption column to remove soluble hydrocarbon oil compounds from the adsorbent material;
    d. further treating the spent adsorbent material in the adsorption column or in a stripping zone to dry the spent adsorbent material to reduce the amount of retained hydrocarbon oil to a predetermined value, to provide a dried spent adsorbent material;
    e. grinding the dried spent adsorbent material containing HPNA compounds and HPNA precursors to produce a free-flowing mass of ground adsorbent particles;
    f. introducing the free-flowing mass of ground adsorbent particles into a fluid feedstream to form a moving mixed feedstream;
    g. introducing the moving mixed fluid feedstream containing the ground adsorbent particles into a membrane wall partial oxidation gasification reactor;
    h. introducing a feedstream comprising a hydrocarbon oil fuel, steam, a predetermined volume of an oxygen-containing gas, and optionally, an ash-forming material into the reactor for combustion to produce a mixture of hot gases containing carbon monoxide and hydrogen, and molten mineral slag;
    i. recovering the mixture of hot carbon monoxide and hydrogen gases from the reactor to provide a synthesis gas.

2. The process of claim 1 which includes analyzing the dried adsorbent particles of step (e) to determine their carbon content based on HPNA compounds and HPNA precursors and any other carbon-containing constituents present in the spent adsorbent material, and controlling the stoichiometric flow rate of oxygen to the reactor to achieve partial oxidation of carbon during combustion to produce carbon monoxide in the reactor.

3. The process of claim 1, wherein the hydrocarbon oil feedstream to the adsorption column comprises a residual oil boiling above 370° C.

4. The process of claim 1 in which the spent adsorbent material containing HPNA compounds and HPNA precursors is selected from the group consisting of activated carbon, attapulgus clay, alumina, silica gel, silica-alumina, spent or fresh catalysts, and combinations thereof.

5. The process of claim 1 or 4 in which the spent adsorbent is activated carbon and the feedstream to the reactor includes an ash-forming material.

6. The process of claim 5 in which the ash-forming material s selected from the group consisting of natural and synthetic oxides of Si, Al, Fe, Ca, Mg, P, K, Na, S and Ti, and mixtures thereof.

7. The process of claim 1 in which the dry spent adsorbent particles are fluidized in a gaseous feedstream for introduction into the membrane wall gasification reactor.

8. The process of claim 7 in which the gaseous feedstream contains oxygen.

9. The process of claim 8 in which the gaseous feedstream is air.

10. The process of claim 3 which includes controlling the amount of spent adsorbent containing HPNA compounds and HPNA precursors particles and oxygen entering the reactor to provide a stoichiometric balance for partial combustion based on the hydrocarbon content of the particles and the residual hydrocarbon oil fuel introduced into the reactor.

11. The process of claim 1 in which the ratio of oxygen-to-carbon in the gasifier is from 0.5:1 to 10:1 by weight.

12. The process of claim 11 in which the ratio of oxygen-to-carbon is from 1:1 to 2:1 by weight.

13. The process of claim 1 in which the dried spent adsorbent particles are fluidized in at least a portion of the hydrocarbon oil fuel to form the feedstock for the reactor.

14. The process of claim 1 in which the dried spent adsorbent particles pass a 35 Tyler mesh size screen.

15. The method of claim 13 in which the dried spent adsorbent particles are mixed with at least a portion of the hydrocarbon oil fuel to form a uniform pumpable fluid mixture following the grinding of the dried adsorbent, and the fluid mixture is introduced into a storage vessel.

16. The process of claim 1 in which the steam is introduced into the reactor's combustion chamber in the ratio of from 0.1:1 to 10:1 by weight of carbon in the feedstock.

17. The process of claim 16 in which the steam is introduced in the ratio of from 0.1:1 to 2:1 by weight of carbon in the feedstock.

18. The process of claim 16 in which the steam is introduced in the ratio of from 0.4:1 to 0.6:1 by weight of carbon in the feedstock.

19. The process of claim 1 which includes cooling the hot synthesis gas from step (i) and subjecting it to a water-gas shift reaction, recovering a mixed stream of hydrogen and carbon dioxide, and thereafter recovering a product stream of hydrogen.

20. The process of claim 19 in which the water-gas shift reaction is maintained at a temperature in the range of from 150° C. to 400° C. and a pressure of from 1 to 60 bars.

21. The process of claim 19 in which the water-to-carbon monoxide mole ratio is 5:1.

22. The process of claim 19 in which the water-to-carbon monoxide mole ratio is at least 3:1.

\* \* \* \* \*